United States Patent [19]

Kroepelin, Jr.

[11] Patent Number: 4,843,687
[45] Date of Patent: Jul. 4, 1989

[54] HAND HELD ROPE CLEAT

[76] Inventor: Willis F. Kroepelin, Jr., 2752 Highway 70, Oroville, Calif. 95965

[21] Appl. No.: 297,927

[22] Filed: Jan. 17, 1989

[51] Int. Cl.⁴ .................. F16G 11/00; B63B 21/04
[52] U.S. Cl. .................... 24/134 P; 24/134 R; 24/134 KB
[58] Field of Search .......... 24/134 P, 134 R, 134 KB, 24/134 KA, 134 N, 134 L; 16/110, 114 R

[56] References Cited

U.S. PATENT DOCUMENTS

| 83,109 | 10/1868 | Thompson . | |
|---|---|---|---|
| 343,814 | 6/1886 | Hedden . | |
| 690,438 | 1/1902 | Jones | 24/134 P |
| 1,520,716 | 12/1924 | Judd | 24/134 P |
| 1,959,722 | 5/1934 | Lackner | 24/134 P |
| 3,678,876 | 7/1972 | Alter . | |
| 3,730,129 | 5/1973 | Helms | 24/134 R |
| 4,620,499 | 11/1986 | Siemmons . | |

Primary Examiner—Victor N. Sakran

[57] ABSTRACT

A portable hand held rope cleat has two opposing rope gripping rotatable cams affixed to a tubular handle by two convergent side arms. The size and structure of the device allows for easy and comfortable gripping of jib sheets while trimming sails during boating. The addition of a support brace elevates the user's hand sufficiently to help prevent injury from the rotating cams and from rope burns.

11 Claims, 5 Drawing Sheets

HAND HELD ROPE CLEAT

BACKGROUND OF THE INVENTION

1. Field of the Invention

The present invention relates to rope gripping devices, and more particularly to hand held devices useful for manually gripping ropes when adjusting the sails on small sailing boats.

2. Description of the prior art

When participating in the sport of sailing, adjustments in the angle of the sail relative to the direction of the wind are generally accomplished by manually grasping the rope, generally referred to in the trade as the main or jib sheet, and forcibly correcting the angle of the sail. The wind exerts a strong force against the sail which often results in problems such as hand fatigue, blisters, or slippage of the rope. Permanently mounted cam cleats for securing the ropes or jib sheets have been found in the Alter's device, U.S. Pat. No. 3,678,876, date July 25, 1972, and the Slemmons Pat., No. 4,620,499, dated Nov. 4, 1986. These devices are designed to be permanently mounted to a stationary surface and not for use as a hand held rope cleat. There are times when portable rope cleats are useful even when a fixed cleat is available. This can occur when attempting to maneuver a jib sheet attached to a billowing sail into a stationary cam cleat. Smaller sailboats typically function with the helmsman steering and handling the main sail while one crewman trims the jib sail by pulling on the attached sheet or rope. Since frequent position setting or trimming the sail is necessary, the crewman will at times be required to maintain a constant tension on the jib sheet. It is during this time the crewman experiences hand fatigue and the other previously mentioned problems. A permanently mounted cam cleat would be ineffective in this case since trimming of the sails at times requires regulation which involves increasing as well as decreasing the tension of the sheets, whereas conventional cam cleats are designed only to maintain or increase tension. To decrease the tension, the sheet must be completely removed from the stationary cam cleat. As my cleat is a hand protecting, hand held device, increasing or decreasing line tension is simply a matter of pulling or releasing pull on the held line.

Several hand held cam cleats designed for uses other than sailboat sheet cleats were found in a past art patent search which included U.S. Pat. No. 343,814, dated June 15, 1886, issued to Hedden; Pat. No. 83,109, dated Oct. 13, 1868, issued to Thompson; and the Judd Pat., No. 1,520,716, dated Dec. 30, 1924. Major changes in the design of these devices would be necessary for them to function in the same capacity as my invention. A two handed grip is common when grasping a rope and therefore would also be natural on a rope cleat device. If a two hand grip were used on any of these devices the natural placement of one hand would be over the rotating cams to help maintain the rope within the cleat, and the other hand would necessarily be on the handle. This would conceivably result in injury should the hand become pinched between the rotating cams. The frame and handle portions vary greatly in size and structure and none appear designed for providing a strong gripping surface which is to be maintained for an extended period of time. Since the tension exerted on the sheets during sailing is sometimes extensive, the handle portion of the hand cleat would necessarily be required to be structured for a comfortable and secure grip. None of the devices could be effectively used, in the state depicted by their respective illustrations or described in their claims, as being safe hand held cleats for trimming jib sheets. No claims or references are made by the inventors as to the versatility of their devices for uses other than those which are specifically stated.

I therefore feel my device comprises a substantial improvement over the previously mentioned past art inventions and provides new and useful benefits to the sport of sailing as will be shown in the following specification.

SUMMARY OF THE INVENTION

My hand held rope cleat is comprised of a handle, two convergent side arms and rope or sheet clamping cams. The handle is comprised of a relatively large diameter tubular rod of sufficient length to accommodate one hand width. Each distal end of the handle is affixed with flat rectangular side arms which angle upward and inward. Each arm develops a spiral bend in the midsection resulting in the opposite ends being positioned in perpendicular planes relative to one another. These distal ends are then fastened to a horizontal plate to which is affixed two opposing rotatable cam cleats serving as the rope or sheet clamping means. A narrow cylindrical support brace is provided to elevate the hand above the rotating cams, preventing the hand from being pinched.

Although my cleat is designed primarily for holding the sheet of a sailing boat jib, it is applicable to a variety of other uses where ropes must be manually tightly retained. As sheet and rope are basically the same item, I use the term rope and sheet interchangeably. When using my hand held cleat, the rope is positioned and engaged between the two rotatable cams with the free end extending down between the angled side arms of the frame. With either the left or right hand grasped firmly on the handle, the other hand can be placed safely over the cams with the rope positioned between the second and third fingers and the thumb resting on the angled side arm. Positioning of the hand over the cams helps to prevent the rope from popping up and disengaging and also provides an increase in pulling strength as well as control. The sturdy design of my device is well suited for rugged use, and the non-corrosive materials stand up well to the weather and salt water. Specific emphasis was applied to a design which was not only functional but comfortable as well.

Therefore, it is a primary object of my invention to provide a portable hand held cleat designed for use in pulling and stabilizing sheets in the sport of sailing.

Another object of my invention is to provide a hand held cleat which is comfortable to hold for extended periods of time.

A further object of my invention is to provide a hand held cleat from which the rope or sheet can be easily disengaged.

A still further object of my invention is to provide a hand held cleat which protects the user's hands from being pinched between the rotating cleats or from experiencing rope burns from rapid advancement of the hand held cleat up the rope.

DESCRIPTION OF THE PREFERRED EMBODIMENT

Figure 1:
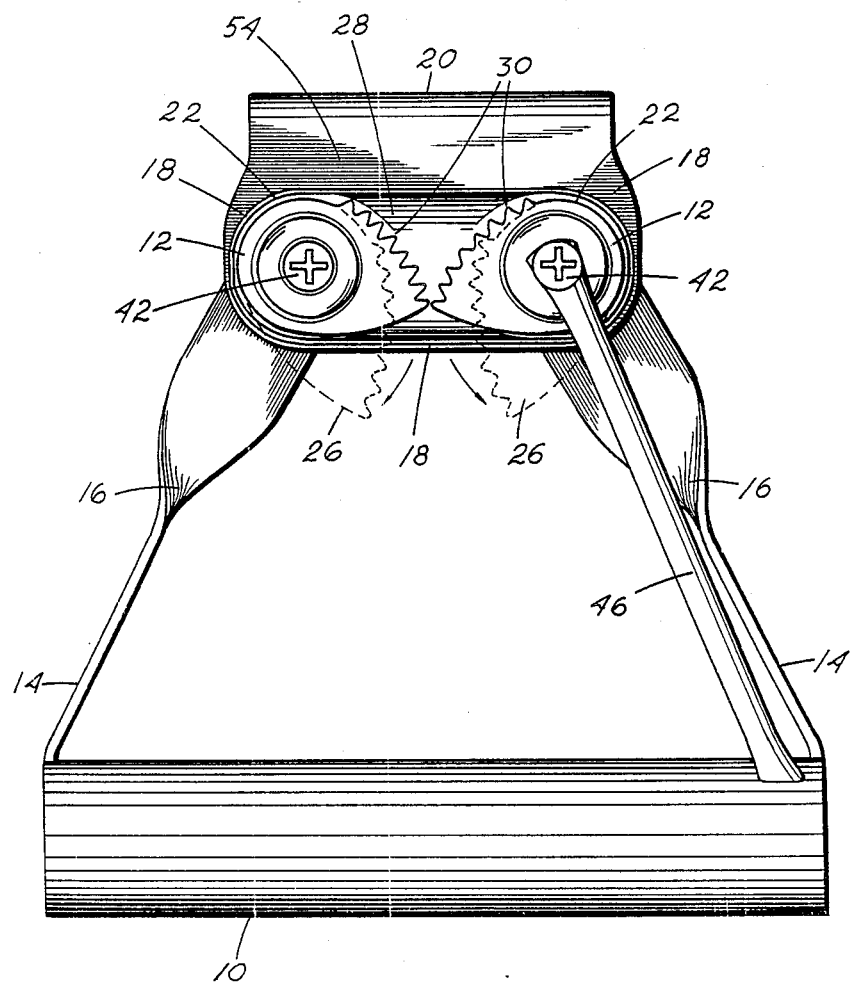
FIG. 1 is a top plan view of the hand held rope cleat illustrating the rotation of the cams.

Referring now to the drawings and to FIG. 1 where the hand held cleat is shown in a top plan view. The hand held cleat is comprised of one tubular handle 10 which is of sufficient length to accommodate the width of one of hands 48. Attached to each end of handle 10 is one side arm 14. Side arm 14 is a thin elongated rectangular panel having one end edge rounded to conform with and permanently attach to the outer end of handle 10, one at each end. Each side arm 14 projects inward from the outer edge of handle 10 and develops one helical or spiral bend 16 along the midsection resulting in opposite ends of side arm 14 lying in perpendicular planes to one another. The flat top and bottom surfaces of the ends of side arms 14 opposite the handle attachment ends lie in the same longitudinal plane and are each affixed to attachment plate 18. Attachment plate 18 lies edgewise parallel to handle 10 and consists of a flat rectangular plate having rounded corners and one lengthwise edge which extends into lengthwise tubular edge 20. Tubular edge 20, a curved tubular roll, forms one terminal end of my hand held rope cleat while handle 10 forms the other terminal end.

Figure 2:
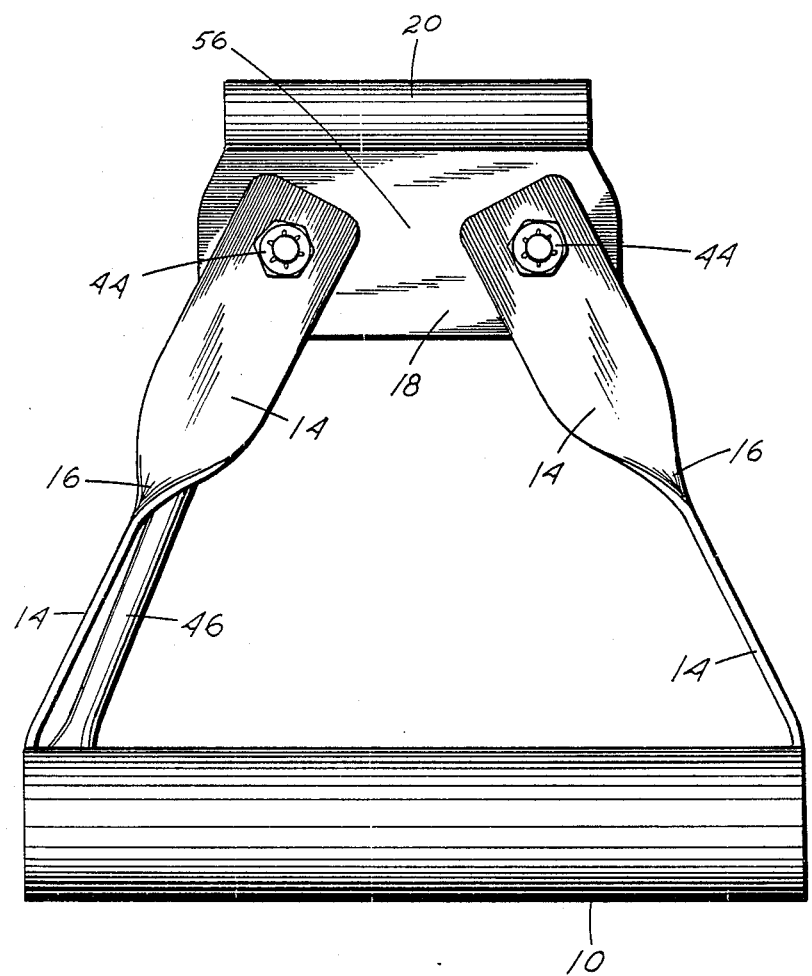
FIG. 2 is a bottom plan view of the hand held rope cleat.
Figure 3:
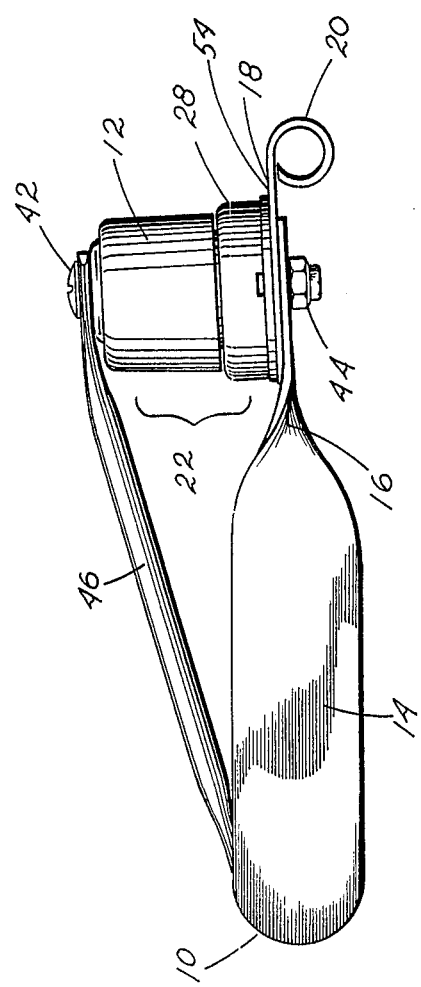
FIG. 3 is a right side view of the invention.
Figure 5:
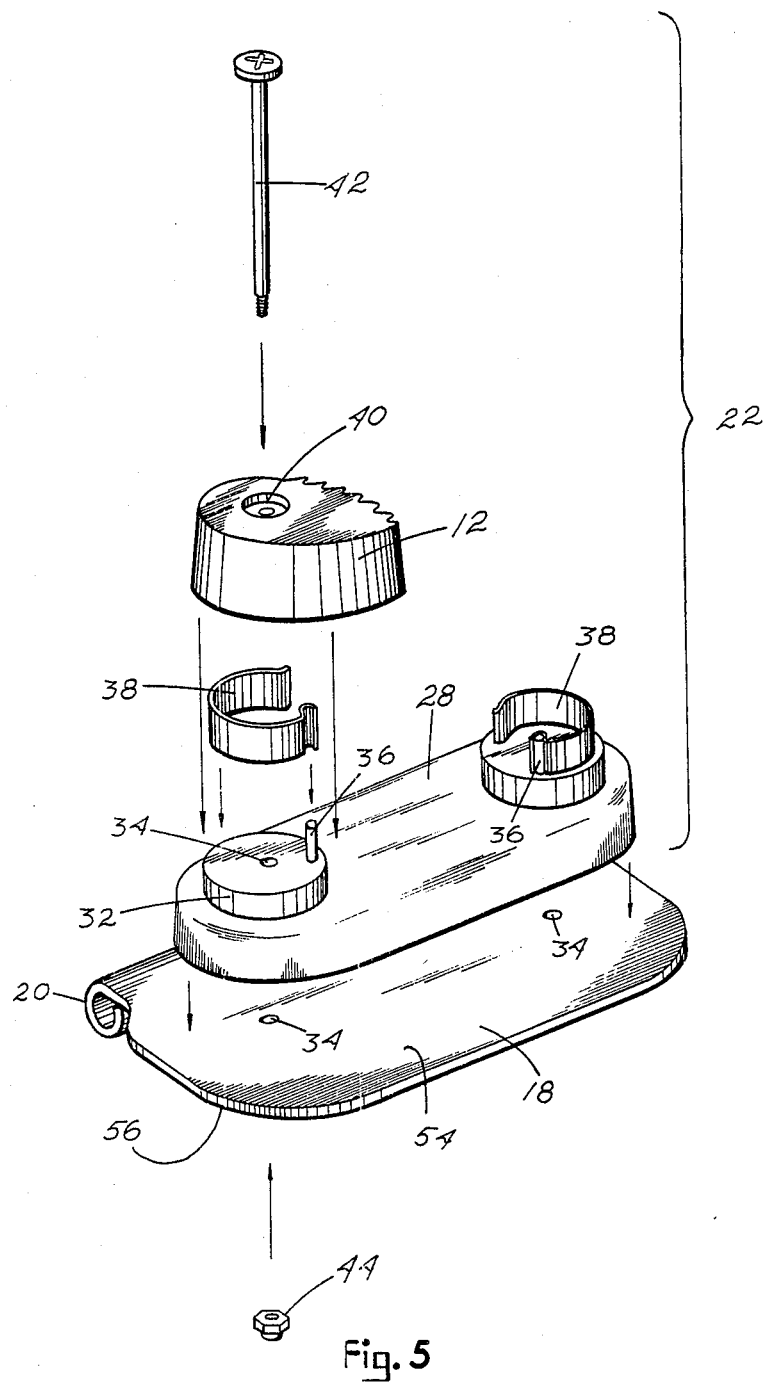
FIG. 5 shows an exploded view of the cam assemblage illustrating one of the cams ready for installation and the biasing springs.

As illustrated in FIGS. 1, 2 and 3, attachment plate 18 has a principal top surface 54 and a principal bottom surface 56. Principal top surface 54 is shown in the top plan view of FIG. 1 and principal bottom surface 56 is shown in the bottom plan view of FIG. 2. The flat surfaced ends of side arms 14 are affixed to principal bottom surface 56 of attachment plate 18 at approximately forty-five degree angles relative to the lengthwise sides of attachment plate 18. See FIG. 2. Principal top surface 54 of attachment plate 18 is affixed with cam assemblage 22, which serves as a rope 24 clamping means. See FIG. 1. Cam assemblage 22 consists of two opposing rotatable cams 12 movably affixed to the top surface of cam base 28. Each cam 12 is cup shaped having an opened bottom surface and a partially enclosed top surface. In FIG. 5, an exploded view of the cam arrangement, cam 12 has substantially vertical side walls with one side cylindrical in form and the other side extending outward in an oval or bowed triangular shape. One side of the triangular bow configuration is affixed with a series of vertical rope engaging teeth 30. Cam base 28 is a substantially rectangular solid base having rounded corners and sized slightly wider in width than each cam 12. Cam base 28 is affixed lengthwise along the top surface of attachment plate 18 parallel to handle 10. The top surface of cam base 28 has two annular projections sized for insertion into the interior of cam 12. Each annular projection, known as cam aligner 32, has a central bolt aperture 34 and one post 36. Bolt aperture 34 continues down through attachment plate 18. Each cam 12 is movable as illustrated in FIG. 1 by moved cams 26 in dotted lines. Cams 12 are maintained in position by a curved flat spring 38, which is positioned on the top surface of cam aligner 32 and endwardly affixed to post 36. Spring 38 is a short curved band which conforms to the cylindrical interior walls of cam 12. One end of spring 38 is adapted to be attached to post 36, located on the top surface of cam aligner 32. The top surface of cam 12 includes a centrally located apertured bolt recess 40 through which is inserted stationary shoulder bolt 42. When assembled, spring 38 is positioned on the surface of cam aligner 32 and attached to post 36. Cam 12 is then placed over cam aligner 32 and shoulder bolt 42 inserted into the aperture of bolt recess 40 and into bolt aperture 34. See FIG. 5. The distal end of shoulder bolt 42 has a short threaded section which is releasably affixed to nut 44. The portion of shoulder bolt 42 which is not threaded is sized sufficient in length to allow free rotational movement of cam 12. Support brace 46 is an elongated cylindrical rod which is permanently affixed on one end to the right edge of handle 10. The opposite end is widened and contains an aperture for releasable attachment to the top surface of the right cam 12 by shoulder bolt 42.

Cam assemblage 22 functions with two spring-biased opposing cams 12, which are essentially mirror images of one another. The sides of each cam 12 which are adjacent one another are affixed with teeth 30. Teeth 30 are comprised of vertical ridges designed to engage with the sides of rope 24 to retain it in a stationary position. Both sides of each cam 12 containing teeth 30 angle downward and are positioned in an approximate ninety degree angle from one another. The apex end of the triangles are positioned adjacent one another in the non-use position and are rotated downward and away from one another when in use as illustrated moved cams 26 shown in FIG. 1.

Figure 4:
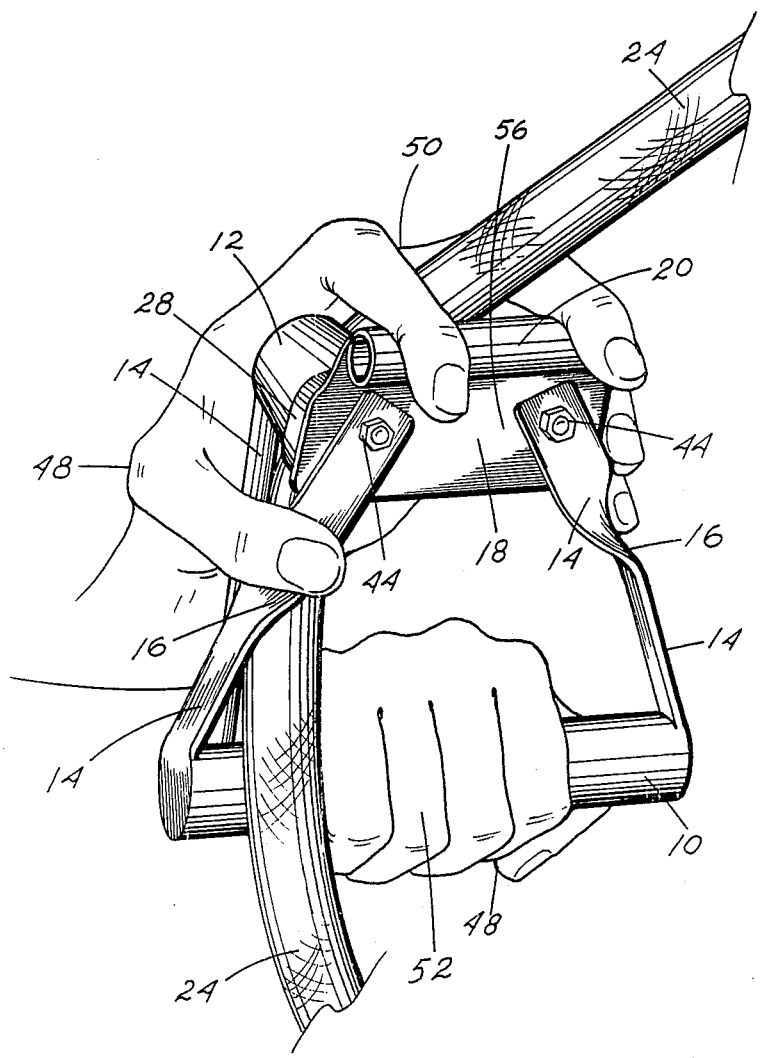
FIG. 4 is an in use perspective bottom view showing placement of the rope and hands.

FIG. 4 shows the hand held rope cleat of the immediate invention in use. Rope 24 is passed downward between the two cams 12, rotating the right cam 12 counterclockwise and the left cam 12 clockwise. This separates both cams 12 sufficiently to allow passage of rope 24. Rope 24 can continue to be freely pulled downward between both cams 12. When an attempt is made to pull rope 24 upward, teeth 30 engage the sides of rope 24, rotating both cams 12 inward. This results in teeth 30 clamping against rope 24 securing it in a stationary position. To release engagement, rope 24 is pulled downward which rotates each cam 12 outward, see moved cams 26 in FIG. 1. When sufficient space is allowed by the outer rotation of each cam 12, rope 24 can lifted out. Baising springs 38 return cams 12 to the inward position.

In use, FIG. 4, after rope 24 is inserted and clamped by cam assemblage 22, left hand 50 is positioned over handle 10 and right hand 52 is placed over both cams 12. Although not illustrated, reversal of both hands 48 positions effects no change in the proper functioning of the device. Rope 24 is now positioned between the first and second finger of left hand 50 with the thumb placed over spiral bend 16. The rounded surface of tubular edge 20 prevents damage to rope 24 and provides a finger hold for better gripping. Although two handed usage of the device is not mandatory for correct functioning of my invention, optimum pulling force and control is obtained with two hands 48. The positioning of right hand 52 or left hand 50 over cams 12 also helps to keep rope 24 from popping out of engagement with cams 12.

A very significant function of support brace 46 is to elevate the left hand 50 above the movement of cams 12. This prevents left hand 50 from being pinched between cams 12 or receiving rope-burns from the rapid advancement of the device. A second support brace 46 could be affixed to the left side of the device although one has been found to be sufficient. Support brace 46 also serves to strengthen the structure, prevent warping. Although support brace 46 is shown in all illustrations positioned on the right side of the device it can also be placed on the left.

The material of manufacture must necessarily be non-corrosive due to usage in and around salt water. High impact resistant plastics and stainless steel are therefore suggested.

Although I have described a preferred embodiment of my invention in detail in the specification, it is obvious that a person skilled in the art can make modifications, therefore, I consider any changes in the design and structure of the invention as my invention when those changes are modifications which fall within the spirit and intended scope of my appended claims.

What I claim as my invention is:

1. A hand held rope cleat for releasably securing a rope under tension, comprising:
   a handle;
   said handle cylindrical and of sufficient length to accommodate the grip of one human hand;
   side arms;
   said side arms being at least two in number configured in elongated rectangular panels positioned oppositely with each of said side arms attached by a side surface to opposite ends of said handle, each said side arm spiral bent transversely centrally providing opposite ends positioned in perpendicular planes relative to one another with free ends of both said side arms fastened to
   an attachment plate;
   said attachment plate being a flat substantially rectangular plate having two principal surfaces thereof horizontally oriented with one said principal surface being a top surface and one said principal surface being a bottom surface;
   said attachment plate having the lengthwise edge opposite said attached side arms formed into a curved tubular roll;
   a rope clamping means;
   said rope clamping means being at least two cams oppositionally affixed by pivotal means to said top surface of said attachment plate with said cams arranged to move inward to a rope gripping position and outward to a rope releasing position;
   at least one support bracket;
   said support bracket being an elongated rod;
   said rod having a first and second end;
   said first end of said rod affixed to said handle adjacent one end thereof;
   said second end of said rod affixed to one of said cams, said rod attached upwardly to said cam by said pivotal means affixing said cam to said attachment plate.

2. The hand held rope cleat of claim 1 wherein said cams oppositionally affixed have widened side walls with interfacing sections of said walls being oblong aligned with transversing teeth arranged for said releasably securing said rope.

3. The hand held rope cleat of claim 1 wherein said two cams oppositionally affixed by pivotal means to said top surface of said attachment plate with said cams arranged to move inward to a rope gripping position and outward to a rope releasing position are spring biased to return to said rope gripping position.

4. The hand held rope cleat of claim 1 wherein said curved tubular roll in said edge of said attachment plate and said support bracket cooperatively being a protective gripping means for a user to hold said hand held rope cleat operationally with fingers clear of said cams.

5. The hand held rope cleat of claim 1 wherein said free ends of both said arms fastened to said attachment plate are preferably attached to said bottom surface of said attachment plate.

6. The hand held rope cleat of claim 1 wherein materials of manufacture include non-corrosive, impact resistance metals and plastics.

7. A hand held rope cleat for releasably securing a rope under tension, comprising:
   a handle;
   said handle cylindrical and of sufficient length to accommodate the grip of one human hand;
   side arms;
   said side arms being at least two in number configured in elongated rectangular panels positioned oppositely with each of said side arms attached by a side surface to opposite ends of said handle, each said side arm spiral bent transversely centrally providing opposite ends positioned in perpendicular planes relative to one another with free ends of both said side arms fastened to
   an attachment plate;
   said attachment plate being a flat substantially rectangular plate having two principal surfaces thereof horizontally oriented with one said principal surface being a top surface and one said principal surface being a bottom surface;
   said attachment plate having the lengthwise edge opposite said attached side arms formed into a curved tubular roll;
   a rope clamping means;
   said rope clamping means being at least two cams having spring biasing and oppositionally affixed by pivotal means to said top surface of said attachment plate with said cams arranged to move inward to a rope gripping position and outward to a rope releasing position with said spring biasing returning said cams to said rope gripping position;
   at least one support bracket;
   said support bracket being an elongated rod;
   said rod having a first and second end;
   said first end of said rod affixed to said handle adjacent one end thereof;
   said second end of said rod affixed to one of said cams, said rod attached upwardly to said cam by said pivotal means affixing said cam to said attachment plate.

8. The hand held rope cleat of claim 7 wherein said cams oppositionally affixed have widened side walls with interfacing sections of said walls being oblong aligned with transversing teeth arranged for said releasably securing said rope.

9. The hand held rope cleat of claim 7 wherein said curved tubular roll in said edge of said attachment plate and said support bracket cooperatively being a protective gripping means for a user to hold said hand held rope cleat operationally with fingers clear of said cams.

10. The hand held rope cleat of claim 7 wherein said free ends of both said arms fastened to said attachment plate are preferably attached to said bottom surface of said attachment plate.

11. The hand held rope cleat of claim 7 wherein materials of manufacture include non-corrosive, impact resistance metals and plastics.

* * * * *